United States Patent [19]

Kominami et al.

[11] 3,770,616

[45] Nov. 6, 1973

[54] METHOD OF REFORMING HYDROCARBONS

[75] Inventors: Naoya Kominami, Tokyo; Toshiyuki Iwaisako; Kusuo Ohki, both of Saitama, all of Japan

[73] Assignee: Asahi Kasei Kogyo Kabushiki Kaisha, Osaka, Japan

[22] Filed: May 5, 1971

[21] Appl. No.: 140,594

[30] Foreign Application Priority Data
May 15, 1970 Japan.............................. 45/40914
Feb. 13, 1971 Japan.............................. 46/5972

[52] U.S. Cl. ........................... 208/138, 252/466 PT
[51] Int. Cl. ............................................. C10g 35/08
[58] Field of Search ........................... 208/138, 139

[56] References Cited
UNITED STATES PATENTS

| | | | |
|---|---|---|---|
| 3,670,044 | 6/1972 | Drehman et al. | 208/138 |
| 3,700,588 | 10/1972 | Weisang et al. | 208/139 |
| 2,378,209 | 6/1945 | Fuller et al. | 260/673.5 |
| 2,500,146 | 3/1950 | Fleck et al. | 208/138 |
| 3,002,920 | 10/1961 | Porter et al. | 208/138 |
| 3,630,961 | 12/1971 | Wilhelm | 252/442 |

FOREIGN PATENTS OR APPLICATIONS

| | | | |
|---|---|---|---|
| 745,703 | 2/1970 | Belgium | 208/138 |
| 751,079 | 5/1970 | Belgium | 208/138 |

*Primary Examiner*—Herbert Levine
*Attorney*—Henry T. Burke, Robert Scobey, Robert S. Dunham, P. E. Henninger, Lester W. Clark, Gerald W. Griffin, Thomas F. Moran, R. Bradlee Boal, Christopher C. Dunham and John F. Scully

[57] ABSTRACT

Method of reforming hydrocarbons which comprises treating a mixture of hydrogen and hydrocarbon at a temperature from 400°C. to 650°C. on a catalyst containing from 0.01 to 5 percent by weight of platinum, from 0.01 to 5 percent by weighth of lead and from 0.01 to 10 percent by weight of at least one member selected from the group consisting of copper, silver, gold, boron, thallium, titanium, zirconium, vanadium, tantalum, manganese, iron, cobalt, nickel, thorium, yttrium, phosphorus, antimony, cerium, scandium, gallium, indium, hafnium and niobium.

1 Claim, No Drawings

METHOD OF REFORMING HYDROCARBONS

BACKGROUND OF THE INVENTION

1. Field of the Invention

This invention relates to a method of reforming hydrocarbons and catalyst used therefor. More particularly, it is concerned with a method of reforming hydrocarbons using a catalyst containing platinum, lead and a third component which is used for reforming reaction mainly involving dehydrogenation of naphthenes and isomerization and dehydrocyclization of paraffins.

2. Description of Prior Art

A number of processes have heretofore been investigated for reforming hydrocarbons, particularly naphtha. Catalysts composed of platinum-alumina, chromia-alumina and the like have been employed in these processes conducted on an industrial scale.

After an extensive investigation of the reforming catalyst, we have found many catalytic systems, which have previously been applied for patent under Japanese Patent Application No. 9488/1969. According to the aforementioned application, they are more economical than prior art catalysts for industrial use in view of higher yield of aromatics, yield of liquid, concentration of aromatics as well as yield of hydrogen. These catalysts are composed of platinum and lead or platinum, lead and several promoters.

The prior-art platinum-alumina catalyst, which is low in activity and high rate of deactivation, was hardly used under severe reaction conditions. For example, the use in the operation at a low pressure such as about 10 kg./cm.$^2$ or in the operation at a high space velocity (SV) was not economical. These disadvantages can be overcome by the invention of the above-mentioned application, improvement of which has now been achieved by the present invention based on the discovery that, in addition to platinum and lead, the components mentioned hereinbelow are effective as the promoter. As the effects of these third components are mentioned increase in the conversion of hydrocarbons, increase in the selectivity of aromatics, decrease of the rate of deactivation, decrease of deposition of carbonaceous materials on the catalyst and the like.

SUMMARY OF THE INVENTION

This invention relates to catalytic composition containing, in addition to platinum and lead, a third promoter component and a method of reforming hydrocarbons using the same. As the third component are used copper, silver, gold, boron, thallium, titanium, zirconium, vanadium, tantalum, manganese, iron, cobalt, nickel, thorium, yttrium, phosphorous, antimony, cerium, scandium, gallium, indium, hafnium and niobium. As the starting material for the platinum, lead and third components may be used a metal or a compound such as oxide, hydroxide, hydrate, salt with an organic or inorganic acid or the like. Particularly with the platinum, it is preferred to use a halogen-containing compound thereof thus preparing a halogen-containing catalyst.

The amount of the components added may be optionally chosen depending upon the conditions under which the catalyst is prepared or used. Preferably, the catalyst contains 0.01–5 percent by weight, especially 0.1–1 percent by weight of platinum, 0.01–5 percent by weight, especially 0.1–2 percent by weight of lead and 0.01–10 percent by weight, especially 0.05–2 percent by weight of the third component. The ratio of platinum to lead of more than 1 to 3, namely, the amount of lead contained by less than 3 times the amount of platinum produces more effective catalysts. The reason why the ratio of platinum to lead is defined in such a manner is considered to be in the action of lead as poisonous to platinum when contained beyond such a range as defined above.

As the carrier may preferably be used silica, silica-alumina, alumina or the like. Alumina produces especially good results.

In supporting the active components upon the carrier, either a procedure which involves impregnating the pre-shaped carrier with a solution of the active components or a procedure which involves mixing a sol of the carrier with the active components to effect cogellation may be used. As the above-cited solution is usually used an aqueous solution and use of an aqueous hydrochloric acid solution is effective for enhancing the catalytic activity.

The reforming reaction as referred to herein, which is carried out using the above-mentioned catalyst, means dehydrogenation of naphthenes, isomerization, hydrocracking and dehydrocyclization of paraffins and the like. As the hydrocarbon are commercially conveniently used naphtha, kerosene, gas oil and the like, although a purehydrocarbon may be used.

In carrying out the reaction pretreatment of the catalyst by passing a hydrogen-containing gas at an elevated temperature around the reaction temperature is effective for enhancing the initial activity. The hydrogen-containing gas employed may contain inert gas or gas such as methane, ethane and propane and the like. By-product gas in the production of ethylene and the off gas from the instant reaction may be used.

The reaction temperature is from 400° to 650°C., preferably from 450° to 550°C. A pressure from 1 to 50 kg./cm$^2$ is applied in the reaction and commercially advantageous is a pressure within the range from 5 to 30 kg./cm.$^2$. The catalyst of this invention, which, when used at a high space velocity under a pressure from 5 to 15 kg./cm$^2$, affords high yield of aromatics, high octane value as well as low rate of deactivation, is very much economical. The volume ratio of hydrogen to hydrocarbon supplied, which has an effect upon the life of the catalyst and/or the composition of the product, is suitably from 1 to 15, preferably from 3 to 10. The rate of feeding, which depends upon the reaction pressure and the composition of the product is from 0.1 to 10 hr.$^{-1}$ in LHSV, preferably from 0.5 to 5.0 hr.$^{-1}$.

DESCRIPTION OF PREFERRED EMBODIMENTS

The following examples in which percentage is by weight is illustrative of the invention.

EXAMPLE 1

Gamma-alumina was impreganted with an aqueous solution of a mixture of chloroplatinic acid $H_2[PtCl_6]\cdot 6H_2O$, lead nitrate $Pb(NO_3)_2$ and copper nitrate $Cu(NO_3)_2\cdot 3H_2O$, and then subjected to evaporation to dryness. The resulting mass was calcined at 580°C. for 1 hour to prepare a catalyst of the composition (0.5% Pt – 0.4% Pb – 0.2% Cu)/$Al_2O_3$. A SUS 32 reaction tube, 14 mm. in inner diameter, was filled with 10 ml. of the catalyst which was then subjected to reduction under hydrogen at 530°C. for 1 hour. A gaseous mixture of hydrogen and naphtha ( of the composition cited below) of a ratio of 1:7.5 was passed through the reaction tube at an LHSV of 2.0 hr.$^{-1}$, a reaction pressure of 14 kg./cm.$^2$ and a reaction temperature of 515°C.

The yield of the product by weight on the basis of naphtha was given below. The results of the reaction are those on average during 50 hours.

Composition of the starting naphtha (% by volume)

| | |
|---|---|
| Paraffin | 67.3 |
| Olefin | 0.2 |
| Naphthene | 21.3 |
| Aromatics | 11.2 |

Reaction product (% by weight)

| | |
|---|---|
| Liquid yield | 83.4 |
| Benzene | 1.5 |
| Toluene | 8.8 |
| $C_8A$ (Aromatics containing 8 carbon atoms) | 22.2 |
| $C_9A$ (Aromatics containing 9 carbon atoms) | 29.2 |
| $C_{10}{}^{+A}$ (Aromatics containing 10 or more carbon atoms) | 7.9 |
| Total aromatics | 69.6 |

EXAMPLE 2

A catalyst of the composition (0.5% Pt – 0.3% Pb – 0.1% B)/$Al_2O_3$ was prepared by the same procedures as in Example 1 using boric acid $H_3BO_3$.

A reaction tube, 1.25 in. in diameter was filled with 50 ml. of the catalyst and the reaction was carried out under the conditions: Reaction pressure 9 kg./cm.$^2$ G, reaction temperature 520°C., LHSV 4.0 hr$^{-1}$ and the ratio of $H_2$ to naphtha (identical with one in Example 1) of 1:5.0. Properties of the liquid products were as follows:

Products

| Reaction time (hr.) | 50 | 100 | 500 |
|---|---|---|---|
| Liquid yield (% by weight) | 83.1 | 83.9 | 84.2 |
| Research octane number (Clear) | 106 | 104 | 103 |

EXAMPLES 3 – 13.

Using 10 ml. of a catalyst containing 0.5 percent of platinum, 0.4 percent of lead and the third component and after pre-treatment under hydrogen at 530°C. for 2 hours, reactions were carried out under the conditions: Reaction pressure 9 kg./cm.$^2$ G, reaction temperature 510°C., ratio of $H_2$ to naphtha (identical with one in Example 1) of 1:5.0 and LHSV 2.0 hr.$^{-1}$. Yields of aromatics on average during 75 hours were as follows:

Catalytic components

| Example No. | Third component (Element) | Amount added (% by weight) | Starting material |
|---|---|---|---|
| 3* | Ag | 0.1 | $AgNO_3$ |
| 4 | Hg | 0.2 | $Hg(C_2H_3O_3)_2$ |
| 5 | Y | 0.1 | $YCl_3 \cdot 6H_2O$ |
| 6 | Th+Ta | 0.4+0.4 | $Th(NO_3)_4 \cdot 4H_2O, TaCl_3$ |
| 7 | Ti+Fe | 0.05+0.05 | $TiCl_4 + Fe(NO_3)_3 \cdot 6H_2O$ |
| 8* | Tl | 0.2 | $TlNO_3$ |
| 9 | Zr | 0.2 | $ZrOCl_2 \cdot 8H_2O$ |
| 10 | V | 0.1 | $NH_4VO_3$ |
| 11 | Mn | 0.1 | $MnCl_2 \cdot 4H_2O$ |
| 12 | Ni | 0.1 | $NiCl_2 \cdot 6H_2O$ |
| 13 | U | 0.5 | $UO_2(NO_3)_2 \cdot 6H_2O$ |

(Note) * In Examples 3 and 8, the third component was added to the platinum-alumina catalyst calcined in advance. In other examples, alumina was impregnated with a solution of mixture of the three or four components.

Results of the reactions

| Example No. | Liquid yield (% by weight) | Yield of aromatics (% by weight) |
|---|---|---|
| 3 | 86.0 | 64.1 |
| 4 | 85.8 | 64.2 |
| 5 | 75.8 | 63.4 |
| 6 | 79.5 | 64.6 |
| 7 | 81.2 | 65.2 |
| 8 | 82.5 | 63.6 |
| 9 | 82.6 | 62.8 |
| 10 | 81.2 | 62.3 |
| 11 | 85.2 | 66.5 |
| 12 | 82.2 | 62.7 |
| 13 | 81.2 | 69.0 |
| Reference Example 1 | 84.4 | 60.2 |
| Example 2 | 81.2 | 45.1 |

(Note) In Reference Examples 1 and 2, reactions were carried out under the same conditions as in the examples using a (0.5% Pt–0.4% Pb)/$Al_2O_3$ catalyst (according to the prior application mentioned above and a 0.5% Pt/$Al_2O_3$ catalyst (the known one) respectively.

EXAMPLE 14

An aqueous solution of chloroplatinic acid $H_2[PtCl_6] \cdot 6H_2O$ and lead nitrate $Pb(NO_3)_2$ respectively at a concentration of 0.1 mole/liter. was poured onto alumina sol (assay 10 percent by weight), followed by evaporation to dryness. The resulting mass was calcined at 600°C. for 30 min. and then impregnated with an aqueous cobalt solution. Evaporation to dryness and calcining at 550°C. for 1 hour yielded a catalyst of the composition (0.5% Pt – 0.2% Pb – 0.1 Co)/$Al_2O_3$.

Using 25 ml. of the catalyst a reaction was carriedout under the conditions: Reaction temperature 500°C., atmospheric pressure, molar ratio of $H_2$ to n-heptane of 3:1 and LHSV 0.5 hr.$^{-1}$. Molar yield of toluene and yield of total aromatics on the basis of the starting heptane were 61.3 percent and 66.2 percent respectively.

EXAMPLE 15

Chloroplatinic acid $H_2(PtCl_6) \cdot 6H_2O$, lead nitrate $Pb(NO_3)_2$, chloroauric acid $HAuCl_4 \cdot 4H_2O$ and preshaped gamma-alumina (sphere, 3 mm. in diameter) were used to prepare a carried mass of the composition 0.5% Pt – 0.4% Pb – 0.5% Au)/$Al_2O_3$, which was calcined at 580°C. for 1 hour to prepare a catalyst.

A SUS reaction tube, 15 mm. in inner diameter, was filled with 15 ml. of the catalyst, which was then subjected to reduction under hydrogen at 520°C. for 3 hours. A reaction was carried out for a gaseous mixture of a hydrogen: naphtha (of the composition cited below, which was the same in the examples given hereinbelow) of ratio of 1:5.0 under the conditions: Reaction temperature 510°C., WHSV 2.5 hr.$^{-1}$ and reaction pressure 10 kg./cm.$^2$. Liquid hydrocarbon yield and yield of aromatics on average during 75 hours on the weight basis of the supplied naphtha were 85.3 percent and 63.2 percent respectively.

Composition of naphtha (% by volume)

| | |
|---|---|
| Paraffin | 60.8 |
| Olefin | 0.3 |
| Naphthene | 26.1 |
| Aromatics | 12.8 |
| Boiling point range | 89°–191°C. |

EXAMPLES 16 – 22

Catalysts were prepared under the same conditions as in Example 15 except for composition of the catalyst and reactions were carried out under the same conditions. Results were as follows:

| Example No. | Third component | Starting material | Amount added (% by weight in terms of the metal) | Liquid yield (% by weight) | Yield of aromatics (% by weight) |
|---|---|---|---|---|---|
| 16 | Sc | $ScCl_3$ | 0.1 | 88.6 | 63.1 |
| 17 | Ga | $GaCl_2$ | .2 | 79.6 | 61.7 |
| 18 | In | $In(No_3)_3 \cdot 3H_2O$ | 1.0 | 84.5 | 64.5 |
| 19 | Hf | $HfOCl_2 \cdot 8H_2O$ | 0.2 | 85.7 | 64.8 |
| 20 | Nb | $NbCl_5$ (with trace HCl added) | .3 | 80.2 | 63.5 |
| 21 | Sb | $SbCl_3$ (with trace HCl added) | 1.5 | 88.2 | 68.3 |
| 22 | Ce | $Ce(No_3)_3 \cdot 6H_2O$ | 1.0 | 86.5 | 66.4 |

EXAMPLE 23

A reaction was carried out in the same way as in Example 15 except that a catalyst of the composition 0.3% Pt –0.3% Pb –20% $P_2O_5$ (added in the form of $H_3PO_4$)/$Al_2O_3$ was used and calcined for 5 hours and a reaction pressure of 15 kg./cm.$^2$, WHSV of 3.0 hr.$^{-1}$ and an $H_2$: naphtha ratio of 7.0 were employed. Average research octane number (Clear) during 50, 100 and 200 hours from the beginning were 107, 108 and 106, respectively.

REFERENCE EXAMPLE 3

A reaction was carried out under the same conditions as in Example 15 except for composition of the catalyst being (0.5% Pt –0.4% Pb)/$Al_2O_3$. Liquid yield and yield of aromatics on average during 75 hours were 82.8 percent and 59.8 percent, respectively.

REFERENCE EXAMPLE 4

A reaction was carried out under the same conditions as in Example 23 except for composition of the catalyst being (0.3% Pt –0.3% Pb)/$Al_2O_3$. Research octane numbers on average during 50, 100 and 168 hours from the beginning were 105, 103 and 102, respectively.

We claim:

1. A method of reforming a naphtha to increase its aromatics content which comprises contacting a gaseous mixture containing hydrogen and naphtha hydrocarbons wherein the volume ratio of hydrogen to hydro-carbon is in the range 1–15 at a temperature in the range from about 400°C. to about 650°C. and at a pressure in the range 1–50 kg/cm$^2$ abs. with a hydrogen reduced catalyst consisting essentially of from about 0.01 to about 5 percent by weight platinum, from about 0.01 to about 5 percent by weight lead and from about 0.01 to about 10 percent by weight of an element selected from the group consisting of copper, silver, gold, boron, vanadium, thorium, yttrium and scandium on a carrier therefor selected from the group consisting of alumina, silica, silica-alumina and zeolite, the amount of lead in said catalyst being less than three times that of platinum and the contacting operation being carried out a an LHSV in the range 0.1–10 HR$^{-1}$.

* * * * *